(12) United States Patent
Fernandez Guzman et al.

(10) Patent No.: US 12,432,534 B2
(45) Date of Patent: Sep. 30, 2025

(54) DATA EXCHANGE WITHIN A ROBOTIC SYSTEM USING MOBILE ROBOTS

(71) Applicant: AGCO International GmbH, Neuhausen (CH)

(72) Inventors: Fernando Benjamin Fernandez Guzman, Marktoberdorf (DE); Leopold Bock-Krausen, Marktoberdorf (DE)

(73) Assignee: AGCO International GmbH, Neuhausen am Rheinfall (CH)

( * ) Notice: Subject to any disclaimer, the term of this patent is extended or adjusted under 35 U.S.C. 154(b) by 102 days.

(21) Appl. No.: 18/252,919

(22) PCT Filed: Sep. 29, 2021

(86) PCT No.: PCT/IB2021/058882
§ 371 (c)(1),
(2) Date: May 15, 2023

(87) PCT Pub. No.: WO2022/123337
PCT Pub. Date: Jun. 16, 2022

(65) Prior Publication Data
US 2023/0422011 A1    Dec. 28, 2023

(30) Foreign Application Priority Data
Dec. 9, 2020  (GB) ..................... 2019413

(51) Int. Cl.
*H04W 4/00*   (2018.01)
*A01B 69/04*  (2006.01)
(Continued)

(52) U.S. Cl.
CPC ............. *H04W 4/80* (2018.02); *A01B 69/008* (2013.01); *G05D 1/0282* (2013.01)

(58) Field of Classification Search
CPC ...... H04W 4/80; A01B 69/008; G05D 1/0282
(Continued)

(56) References Cited

U.S. PATENT DOCUMENTS 9,310,802 B1   4/2016  Elkins et al.
10,499,308 B2  12/2019 Delarochelliere et al.
(Continued)

FOREIGN PATENT DOCUMENTS

| AU | 2018204155 A1 | 1/2019 |
|----|---------------|--------|
| GB | 2532966 A     | 6/2016 |
| KR | 20180104488 A | 9/2018 |

OTHER PUBLICATIONS

UK Intellectual Property Office, Search report for related UK Application No. GB2019413.0 dated May 11, 2021, 3 pages.
(Continued)

*Primary Examiner* — Mahmoud S Ismail

(57) ABSTRACT

The disclosure provides a method for exchanging data within a robotic system comprising a mobile field robot for operating in a field and a mobile service robot, the field robot and the service robot each comprising a buffer for storing data and a first communication device with a short-range communication reach for exchanging data with each other, the method comprising: commanding the field robot to operate in the field using data stored in the buffer of the field robot, recognizing a necessity of a data transfer for the field robot, commanding the service robot to approach to the field robot, detecting that one of the robots is covered by the short-range communication reach of the other robot, initiating a data transfer between the field robot and the service robot.

12 Claims, 8 Drawing Sheets

(51) Int. Cl.
    *G05D 1/00*     (2006.01)
    *H04W 4/80*     (2018.01)
(58) Field of Classification Search
    USPC .............................................. 701/2
    See application file for complete search history.

(56)                References Cited

U.S. PATENT DOCUMENTS

2007/0030809 A1*   2/2007  Dayama ................ H04W 40/12
                                                    370/237
2008/0275609 A1*  11/2008  Boydell ............... A01B 69/008
                                                    701/42
2020/0252768 A1*   8/2020  Staub ...................... H04W 4/80
2022/0183209 A1*   6/2022  Scott-Robinson ... A01B 69/008

OTHER PUBLICATIONS

European Patent Office, International Search Report related to International Patent Application No. PCT/IB2021/058882, mail date Jan. 7, 2022, 13 pages.

* cited by examiner

DATA EXCHANGE WITHIN A ROBOTIC SYSTEM USING MOBILE ROBOTS

CROSS-REFERENCE TO RELATED APPLICATIONS

This application is a national phase entry under 35 U.S.C. § 371 of International Patent Application PCT/IB2021/058882, filed Sep. 9, 2021, designating the United States of America and published in English as International Patent Publication WO 2022/123337 A1 on Jun. 16, 2022, which claims the benefit of the filing date of U. K. Provisional Patent Application 2019413.0 "Data Exchange Within a Robotic System Using Mobile Robots," filed Dec. 9, 2020, the entire disclosure of which is incorporated herein by reference.

FIELD

The disclosure relates to a robotic system comprising at least two mobile robots and an exchange of data between the at least two mobile robots and a logistic unit to manage a field operation.

BACKGROUND

AU 2018204155 A1 discloses an autonomous agricultural vehicle and a data transfer station. The data transfer station comprises a first communications device for transfer of large data files at a high data transfer rate and a second communications device adapted for long-range communication. The agricultural vehicle proceeds to the data transfer station when the data storage of the agricultural vehicle is full or nearly full and the vehicle needs to transfer data to the data transfer station in order to free up memory on the data storage of the agricultural vehicle.

Due to the fact that the vehicle will proceed to the data transfer station based on a capacity of the data storage of the agricultural vehicle, the field operation of the vehicle will be interrupted and the return to the data transfer station will lead to a more intense soil compaction.

US 2015/0168560 A1 discloses a repeater system for an autonomous agricultural vehicle to send a RTK correction information to another autonomous agricultural vehicle being outside the coverage area of a base station. Thus, the range of the base station can be extended even further for propagating the RTK correction information up to its validity range. However, the repeater functionality is not capable to transfer a huge amount of data between the two agricultural vehicles and/or the base station.

Finally, the capacities of preferred data storages for industrial or agricultural applications, especially for embedded systems or electronic control units (ECU) due to high real time performance requirements, are very limited. But that limitation is contrary to the requirements of agricultural applications which generate a great amount of data to be stored when an operation in the field is driven by protocols and/or recorded by an agricultural vehicle.

BRIEF SUMMARY

It is an objective of the disclosure to provide a robotic system for transferring data, especially a fast transfer of a great amount of data, between a mobile robot and a logistic unit without the need of the mobile robot to return to the logistic unit for the transfer of data.

The disclosure is directed to a method for exchanging data within a robotic system and a controller configured to carry out the method.

The robotic system comprises a mobile field robot for operating in a field and a mobile service robot, wherein each of the field robot and the service robot comprise a buffer for storing data and a first communication device with a short-range communication reach for exchanging data with each other. The method for exchanging data within the robotic system comprises: Commanding the field robot to operate in the field using data stored in the buffer of the field robot, recognizing a necessity of a data transfer for the field robot, commanding the service robot to approach to the field robot, detecting that one of the robots is covered by the short-range communication reach of the other robot, initiating a data transfer between the field robot and the service robot.

The field robot is preferably an autonomous agricultural robot having a tool to treat an agricultural field, e. g. a seeding unit or a weeding unit. While the field robot is operating in the field, the field robot can follow protocol or record its operation and save the operational data about the field operation to its buffer. For example, the field robot can record the position of each single seed placed in the field and document the seeding by a video stream. Due to the limited storage capacity of the buffer, the buffer can get full of data before the operation finished. The free available buffer space can be monitored continuously to detect the insufficient buffer space and to recognize (i.e., automatically detect) the necessity of a data transfer for the field robot.

To avoid a data loss e. g. due to a buffer overflow, and to keep buffer space available for the completion of the operation, the recorded data about the field operation needs to be backed up to a data storage external from the field robot, preferably to a logistic unit having sufficient data storage capacity, e. g. in terms of a local data storage or a cloud storage. Afterwards, the buffer of the field robot can be freed up to provide buffer space for further recordings of the field operation.

A necessity of a data transfer for the field robot can also be recognized if any other issue arises, for example a shortcoming of the buffer of the field robot, especially a shortcoming preventing a completion of the field operation by the affected robot. The necessity of a data transfer can arise if data should be transferred from the buffer of the field robot to the logistic unit or if data should be transferred from the logistic unit to the field robot.

In the case that the logistic unit is out of the short-range communication reach of the first communication device of the field robot, a data transfer to back up the data of the buffer of the field robot is not possible. Thus, the service robot can be commanded to approach to the field robot so that the service robot will be covered by the short-range communication reach of the first communication device of the field robot. Then, the field robot can be commanded to transfer the data of the buffer of the field robot to the service robot. After the data transfer, the buffer of the field robot can be freed up.

The service robot containing the data of the field robot can be commanded to move in proximity to the logistic unit so that the logistic unit is covered by the short-range communication reach of the first communication device of the service robot and to transfer the data of the field robot to the logistic unit. Thus, the data of the field robot can be transferred to the logistic unit without the need of the field robot to return to the logistic unit.

The field can be divided and can comprise at least one subfield. Preferably, the field robot is configured to operate in one of the at least one subfield whereas the service robot is configured to operate exclusively out of the subfield. For example, the field robot can be guided along a path extending through the subfield whereas the service robot is guided along a path extending out of the subfield only having no interference with the path in the subfield. Preferably, the headland surrounds the subfield so that the headland is uncovered by the subfield and the path of the service robot extends through the headland only. Hence, a collision between the field robot and the service robot within the subfield can be avoided. Additionally, the soil compaction within the subfield can be reduced if the service robot is inhibited to traverse through the subfield.

If the path of the field robot and the path of the service robot are spaced apart further than the short-range communication reach of the first communication devices of the robots, a dead zone exists. In other words, the dead zone is characterized in that the field robot and the service robot each are not coverable by the short-range communication reach of the other robot when the field robot is located in the dead zone. When the field robot moves within the dead zone, the data transfer between the field robot and the service robot will be interrupted. But the short-range communication reaches of the field robot and the service robot as well as all locations that can be arrived by both robots (according to their paths) are known to the robotic system. Based on this information, the dead zone can be determined by the method.

In a further act, the method can check whether the free buffer space of the field robot is sufficient for a field operation in the dead zone, especially to cross the dead zone. If the free buffer space is insufficient, the method will recognize a necessity of a data transfer. As a consequence, the field robot can be stopped before entering the dead zone to avoid that the field robot will become stuck in the dead zone.

Preferably, the service robot is commanded to approach to the field robot before the buffer of the field robot runs out of data to reduce down time of the field robot. Thus, the method will recognize a necessity of a data transfer if a threshold of data stored to the buffer of the field robot is exceeded. The threshold can be set to any value, e. g. 80% of the buffer size. The threshold can be monitored by a controller of the field robot. If the threshold is exceeded, the logistic unit can command the service robot to approach to the field robot as described above.

When the service robot is close enough to the field robot, a data transfer can be initiated to transfer the operational data of the field robot from the buffer of the field robot to the buffer of the service robot. After the data backup, the buffer space of the field robot can be freed up.

Possibly the data size containing a full path and all tasks allocated to the full path for a complete field operation of the field robot is too big to be stored to the buffer of the field robot at once due to the limited buffer size. Instead, a path segment of the full path together with the tasks allocated to the path segment only can be stored to the buffer. After the field robot has finished the field operation along the first path segment, the path segment can be replaced by a subsequent path segment with allocated tasks for a continuous path operation. To indicate that a replacement of a path segment is needed, the position of the field robot and its distance to the end of the path segment can be monitored and the point in time when the data for the subsequent path with the allocated tasks will be missing can be determined.

Thus, a necessity of a data transfer for the field robot can also be recognized if additional data to that stored in the buffer of the field robot is required, especially if a data set containing a path to guide the field robot and tasks allocated to the path to define the field operation of the field robot are missing. Then, the service robot containing the subsequent path segment with the tasks allocated to the subsequent path segment in its buffer can be commanded to approach to the field robot. Preferably, the service robot is commanded before the field robot has arrived at the end of the path segment that it is currently moving along. For example, if a calculated time needed by the field robot to arrive at the end of the path segment is lower than a predefined time threshold, the service robot can be triggered to get in proximity to the field robot for a data transfer via the short-range communication devices. Thus, downtime of the field robot after it has arrived at the end of the path segment can be reduced. It will be checked when the service robot and the field robot are close enough. Then, a data transfer can be initiated to transfer the data containing information for proceeding the field operation from the buffer of the service robot to the buffer of the field robot.

As described above, the robotic system can comprise a logistic unit, wherein the logistic unit preferably comprises a data storage and a first communication device with a short-range communication reach for exchanging data with the field robot or the service robot. The data storage of the logistic unit can be used to store a data set containing a path for the field robot to be guided along and at least a task allocated to the path defining the field operation of the field robot. The path can be a full path or a path segment of the full path.

Preferably, the path can be created by a central controller of the logistic unit. Alternatively, the path was created by an external unit, e. g. a host computer or a path planning app, and transferred to the logistic unit, e. g. via a cloud connection, to be stored to the data storage of the logistic unit.

Analogously, a path for the service robot can be created and stored to the data storage. Thus, the logistic unit can centrally plan and manage the field operation of both robots including an updating of the field robot or the service robot with a new or an amended path (segment). For example, the logistic unit can calculate how many path segments are needed so that the field robot can treat its assigned subfield. The logistic unit can also manage additional field robots for treating the field simultaneously by a swarm of field robots. The logistic unit can also divide the field into several subfields, calculate a path through each subfield and assign each path to a single field robot of the swarm, wherein the service robot can be used to transfer the data of each path to the corresponding field robot.

When a path or a path segment is calculated, a first waypoint as a starting point of the path (segment) and a second waypoint as an (intermediate) end point of the path (segment) will be determined. To avoid that a path (segment) of a field robot ends in the dead zone, the path for the field robot is preferably created such that the path extends through the subfield from a first waypoint to a second waypoint, wherein the second waypoint is located out of the dead zone.

Preferably, the logistic unit, the service robot, and the field robot each comprise a second communication device with a long-range communication reach being greater than the short-range communication reach, wherein the field robot and the service robot are commanded by commands sent by the logistic unit via the second communication device. In the case of a swarm of field robots, the logistic unit can also command the complete swarm. The commands can be sent to a field robot as well as to the service robot to command each robot for example to start moving, to move to a specific waypoint, to stop immediately, to stop at a waypoint or to initiate a data transfer.

Preferably, the long-range communication reach covers the field completely so that data can be transferred between the logistic unit and a field robot or the service robot without the need of any robot to approach to the logistic unit.

Preferably, the bandwidth of the first communication device is higher than the bandwidth of the second communication device and adapted to transfer the data set (containing the path and the allocated tasks) or the operational data of the field robot, e. g. the recordings of the field operation. For example, the bandwidth of the first communication device can be designed to transfer the full buffer content in less than one minute. Thus, the long-range communication channel can be used for an immediate data exchange to control a robot whereas the short-range communication channel can be used for a fast exchange of a great amount of data as the recordings of the field operation.

To indicate that an immediate data exchange is needed, a corresponding data message containing information of the recognition of the necessity of a data transfer for the field robot, especially in case of a detection of insufficient free buffer space of the field robot, can be sent from the field robot to the logistic unit via the second communication device with the long-range communication reach. The data message sent from the field robot to the logistic unit via the second communication device can be received by the logistic unit. The long-range communication channel can also be used by the logistic unit to retrieve the current position of each robot, to retrieve any other status information of the robots, e. g. an error message or a confirmation that a process such as the data transfer has finished. Additionally, an immediate data exchange can also be required, if the logistic unit needs operational data from the field robot, e.g., to plan the tasks for the field operation.

Based on the retrieved positions of the field robot and the service robot the central controller of the logistic unit can calculate and compare the distance between the field robot and the logistic unit and the distance between the service robot and the logistic unit as well as the travel times for each distance. Thereafter, the central controller can estimate how much time the field robot would need for a completion of a data transfer through the short-range communication channel if the service robot approaches to the field robot and if the field robot approaches to the logistic unit and decide for the faster alternative. For example, the service robot can be commanded to approach to the field robot if a travel time or a travel distance from the service robot to the field robot is shorter than a travel time or travel distance from the field robot to the logistic unit.

If the field robot is commanded to approach to the logistic unit, then the data can be exchanged directly between the field robot and the logistic unit instead of using the service robot as a data transmitter to transfer operational data of the field robot to the logistic unit.

In the case that data shall be transferred from the logistic unit to the field robot, e. g. for a bidirectional data transfer between the field robot and the logistic unit, the service robot can also be used as a transmitter. To transfer data from the logistic unit to the field robot through the short-range communication channel without the need of the field robot to approach to the logistic unit, the following acts of the method can be executed: commanding the service robot to approach to the logistic unit, detecting that the service robot is covered by the short-range communication reach of the logistic unit, initiating a transfer of the first data set from the data storage of the logistic unit to the buffer of the service robot, commanding the service robot to approach the field robot, detecting that one of the robots is covered by the short-range communication reach of the other robot, and initiating a transfer of the data set from the buffer of the service robot to the buffer of the field robot.

Then, the operational data of the field robot could be transferred to the service robot as described above. To back up the data of the field robot, the central controller of the logistic unit can command the service robot to approach to the logistic unit and initiate a data transfer to transfer the operational data of the field robot from the buffer of the service robot to the data storage of the logistic unit.

The robotic system can comprise an additional mobile field robot configured to operate in a subfield different to the subfield of the other field robot, wherein the subfield of the additional field robot is free of a dead zone. In other words, irrespective of the current position of the additional field robot in the subfield, the service robot can get close enough to the additional field robot without entering the subfield to transfer data through the short-range communication channel. For example, the additional field robot can be guided along a path extending through the subfield. The path of the additional field robot and the path of the service robot extending through the headland can be close together so that the short-range communication reach of the first communication device of the one robot can cover the path of the other robot at a specific position on the path.

The method or separate acts of the method as described above can be carried out by the controller of the field robot, by the controller of the service robot or preferably by the central controller of the logistic unit. The method can be implemented in a computer program product stored to a computer readable memory being part of the controller. Preferably, the logistic unit commands the field robot and the service robot.

Within the scope of this application, it should be understood that the various aspects, embodiments, examples, and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

The disclosure will now be described, by way of example only, with reference to the accompanying drawings in which.

DETAILED DESCRIPTION

Figure 1:
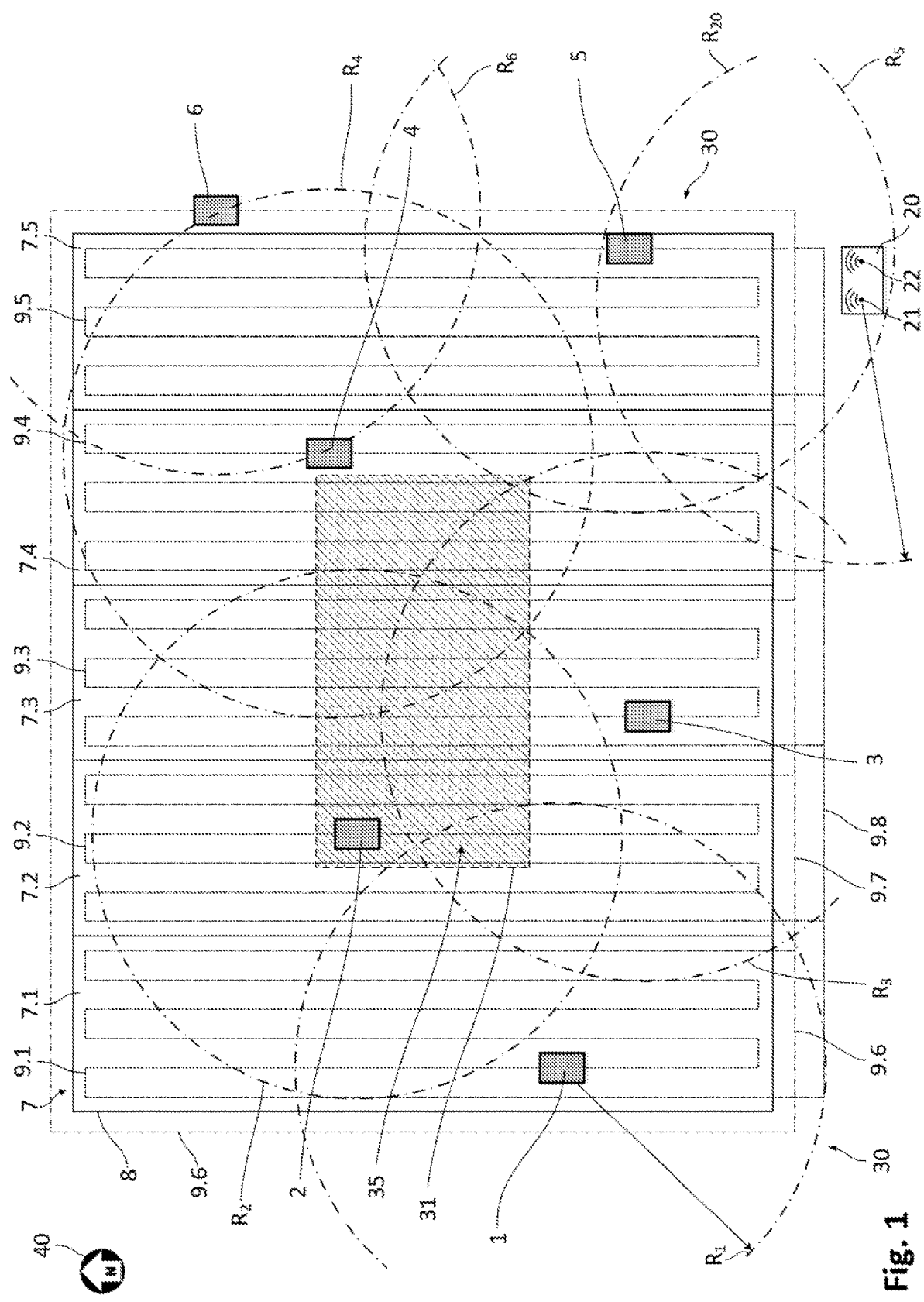
FIG. 1 shows several robots operating in a field.

FIG. 1 shows an agricultural field 7 circumscribed by the border 8. The periphery outside the border 8 can be used as a headland 30. Inside the border 8, the agricultural field 7 is divided into five subfields 7.1 to 7.5. On each subfield 7.1 to 7.5, a separate autonomous field robot 1 to 5 is deployed to perform an agricultural operation, e. g. seeding seeds, weeding, spraying, analyzing the plants or the soil, etc. Field robot 1 is allocated to subfield 7.1, field robot 2 is allocated to subfield 7.2, and so on, wherein each field robot 1 to 5 has its own path 9.1 to 9.5 to traverse and to treat its correlated subfield 7.1 to 7.5.

An additional sixth robot is used as a service robot 6 that travels outside the field 7 in the headland 30 along a path 9.6 surrounding the field border 8.

Field Robots

Figure 4:
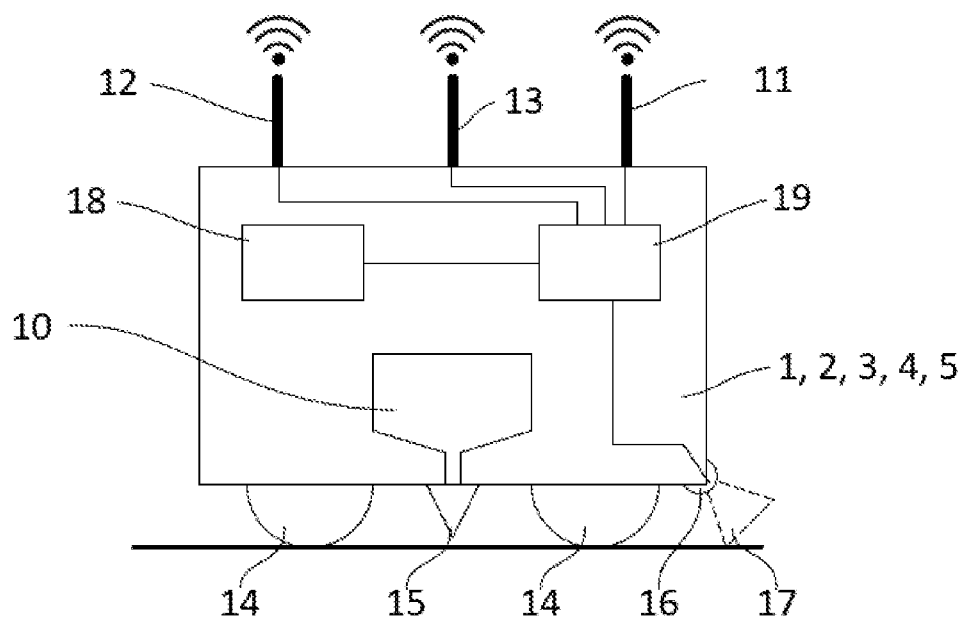
FIG. 4 schematically represents a field robot.

A schematic example of a field robot 1 to 5 is shown in FIG. 4. Each field robot 1 to 5 comprises at least three wheels 14 to traverse the agricultural field 7, a tool 15 to treat the agricultural field 7 (e. g. a weeding unit, a spraying, seeding unit or something else), a global positioning system 13 (e. g. GLONASS+RTK: GPS, Galileo, . . . ), a sensor device 16 (e. g. camera) with a sensor detection range 17 to capture data of the agricultural field 7 (e. g. condition of the plants or the soil) or the treatment of the agricultural field 7 (e. g. logging performance of the executed task at a certain position in the field 7) and a local data storage used as buffer 18 (e. g. store the recordings of the field operation, e. g. to store the position, time and sensor data acquired by the sensor device, while traversing or treating the agricultural field 7). As explained above, the storage capacity of the buffer 18 is very limited. The tool 15 can be connected with a bin 10 that can be filled with resources such as seeds to be planted or liquids to be sprayed.

In addition, the field robot 1 to 5 comprises a short-range communication device 11 with a high bandwidth and a long-range communication device 12 with a low bandwidth. The field robot 1 to 5 comprises also a controller 19 (e. g. a microcontroller) that is connected with all controllable elements of the robot (e. g. the short/long-range communication devices 11 and 12, the global positioning system 13, the sensor device 15, the buffer 18 and the actuators (not shown) of the tool 15 and the wheels 14.

Service Robot

The service robot 6 can be of the type of a field robot 1 to 5. Preferably the buffer 18 of the service robot 6 comprises more storage capacity compared to the field robots 1 to 5. Preferably the buffer size 18 of the service robot 6 is at least doubled compared to a field robot 1 to 5 with the greatest buffer size. The service robot 6 can be equipped without the tool 15 and without the bin 10.

Logistic Unit

Figure 5:
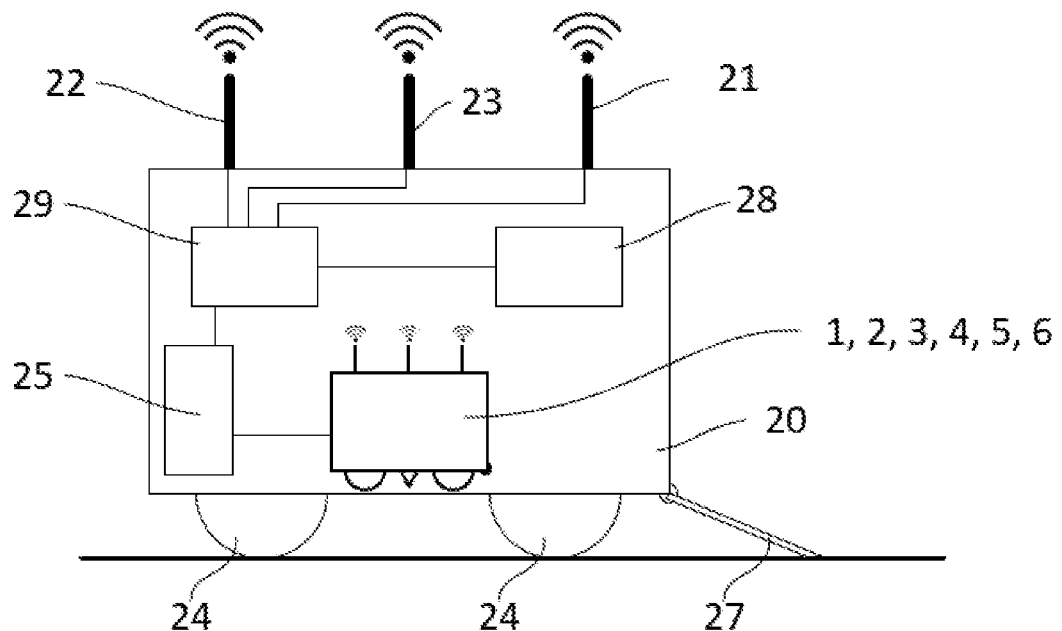
FIG. 5 schematically represents a logistics unit.

A (stationary) logistic unit 20 is deployed outside the field 7 (inside or outside the headland 30). FIG. 5 shows a schematic view of the logistic unit 20. The logistic unit 20 comprises a cellular communication device 23 to get connected with an internet provider or any cloud service. The position of the logistic unit 20 outside the field 7 is chosen such that it has a cellular net connectivity of a very good quality.

In addition, the logistic unit 20 comprises a local data storage 28 that is large enough to store all data required for the field operation of all robots 1 to 6 from the beginning to the end of the operation.

The logistic unit 20 comprises also a service unit 25 for maintenance and inspection of any robot 1 to 6. Any robot 1 to 6 can access the logistic unit 20 via a ramp 27 and get connected with the service unit 25. Then, the service unit 25 can refresh the energy storage, e. g. a battery (not shown), with electric energy or refill the bin 10 with new resources. The service unit 25 can also start a diagnosis function to check the functionality of the connected robot and repair a malfunction. The service unit 25 can also exchange the tool 15 of the robot, e. g. substitute a seeding unit by a spraying unit. The service unit 25 connected with the robot has also access to the buffer 18 of the robot and can read, write, and delete data of the buffer 18, e. g. if the wireless connection has a failure. A central controller 29 is connected with all controllable elements of the logistic unit 20.

Analogous to the robots 1 to 6 the logistic unit 20 comprises a short distance communication device 21 with high bandwidth and a long-distance communication device 22 with low bandwidth to enable two different channels of data communication between the logistic unit 20 and each single robot 1 to 6.

Long and Short-Range Communication

The reach of the long-range communication devices 12 and 22 are long enough that each robot 1 to 6 can stay connected to the logistic unit 20 at every place along their paths 9.1 to 9.6 to send and receive data via a corresponding long-range communication channel. But the bandwidth of the long-range communication devices is rather low and enables transfer of only small data packages as simple commands (start moving, stop moving, return to logistic unit) or a coordinate to which a robot 1 to 6 shall move to.

Figure 2:
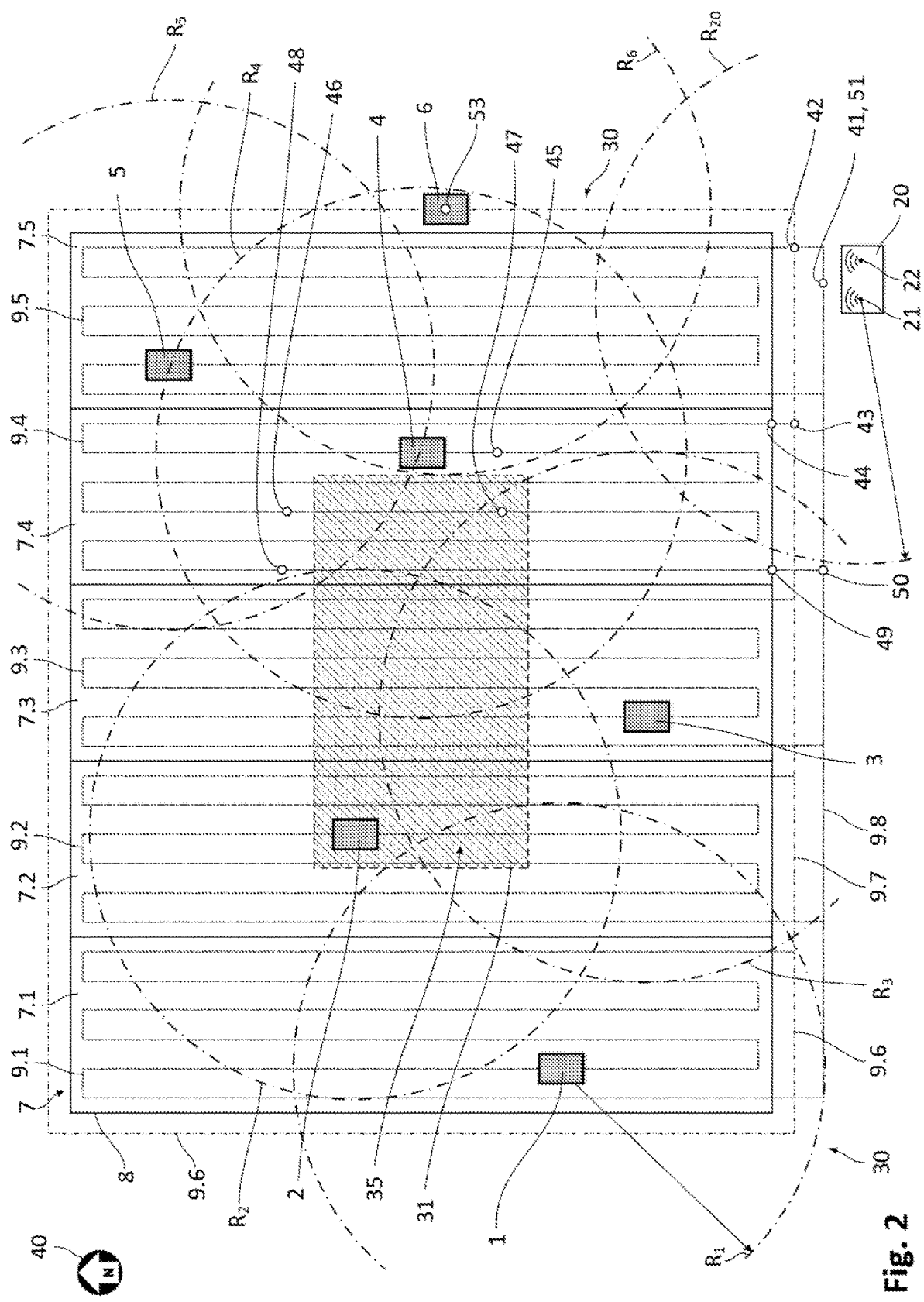
FIG. 2 shows several robots operating in a field.
Figure 3:
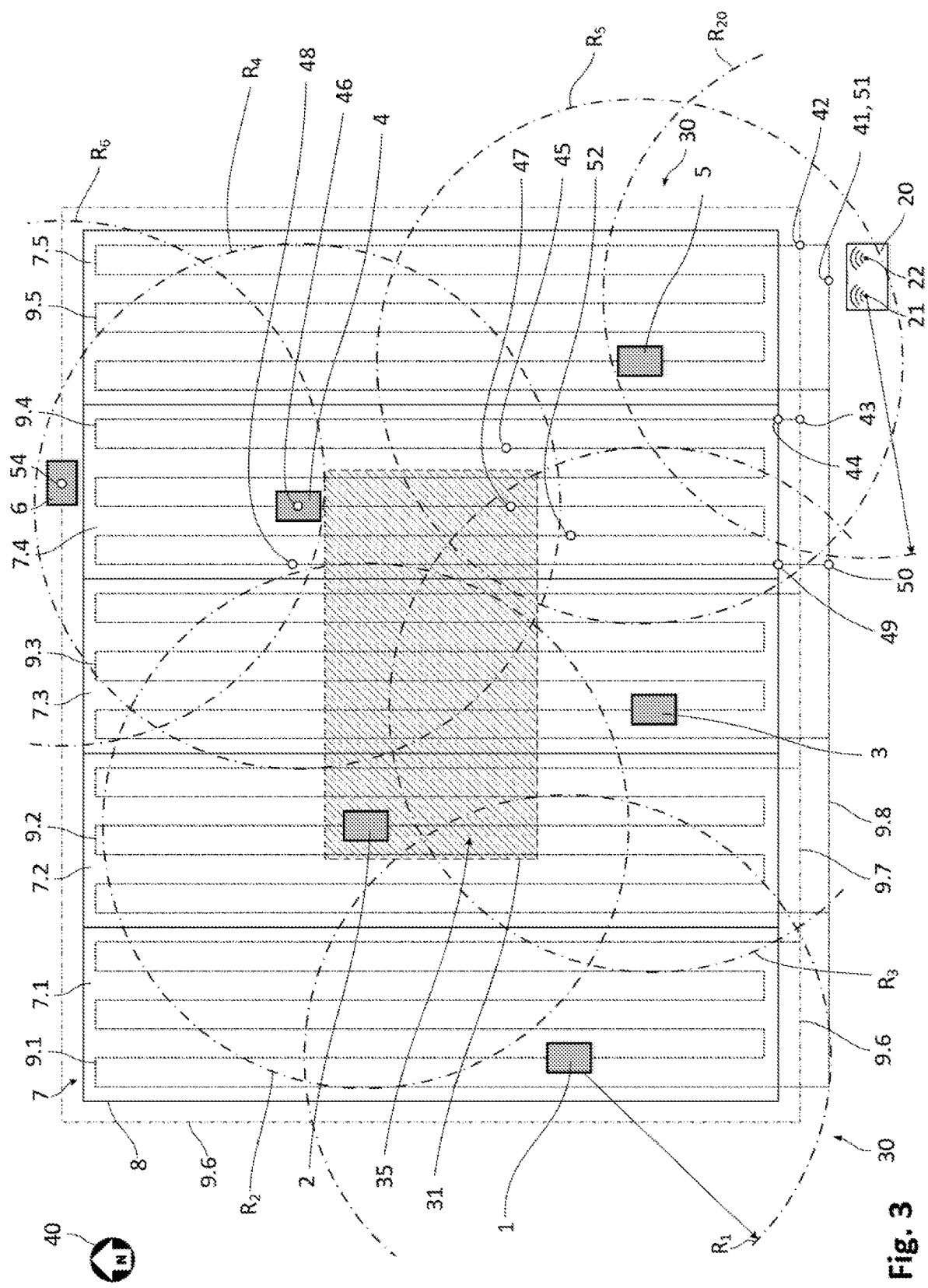
FIG. 3 shows several robots operating in a field.

In contrast to the long-range communication devices 12 and 22, the short-range communication devices 11 and 21 have a high bandwidth but a low reach limited to a radius R. FIGS. 1 to 3 show the reaches R1 to R6 and R20 of each short-range communication devices 11 of the corresponding robots 1 to 6 and the short-range communication device 21 of the logistic unit 20.

If big data packages such as the data recordings of a robot 1 to 6 are to be transferred from the corresponding robot 1 to 6 to the logistic unit 20, the higher bandwidth of the short-range distance communication devices 11 is needed. But the agricultural field 7 cannot be covered completely by the short-range distance communication devices 21 and 22 for a stable data exchange connection due to the much more limited reach of the short-range distance communication devices 11 and 21. In other words, a data transfer via the short-range channel is only possible, if the distance between the corresponding robot 1 to 6 and the logistic unit 20 is small enough. This is the case when the reach R1 to R6 of a robot 1 to 6 covers the logistic unit 20, e. g. between field robot 5 and the logistic unit 20 through the overlapping reaches (or ranges) R5 and R20 as shown in FIG. 1.

When the reach R20 of the logistic unit 20 covers one of the robots 1 to 6, data can be transferred from the logistic unit 20 to the corresponding robot 1 to 6, as depicted in FIG. 1 between the logistic unit 20 and the robot 5. In other words, if any robot 1 to 6 and the logistic unit 20 are covered mutually by their reaches, a bidirectional data transfer via the short-range communication channel between the logistic unit 20 and the corresponding robot 1 to 6 is possible.

This means, if data between one of the field robots 1 to 5 being outside of the reach R20 of the logistic unit 20 and the logistic unit 20 being outside of the reach R1 to R5 of the corresponding robot 1 to 5 is required to be exchanged through the short-range communication devices 11 and 21, the corresponding robot 1 to 5 would need to approach the logistic unit 20 until the robot 1 to 5 and the logistic unit 20 are mutually covered by their reaches R1 to R5 and R20. But the greater the distance between a field robot 1 to 5 and the logistic unit 20 is, the more inefficient the field operation will be, because the corresponding field robot 1 to 5 needs to drive additional routes, consumes more energy, needs more operational time, etc.

Thus, the intention of the disclosure is to use the service robot 6 as a mobile data exchange unit to transfer data between one of the field robots 1 to 5 and the logistic unit 20. For that purpose, the service robot 6 works like a postal service: if data should be transferred from the logistic unit 20 to one of the field robots 1 to 5 being out of reach of the short-range communication, the service robot 6 moves along its path 9.6 to the logistic unit 20. While the short-range communication reach R20 of the logistic unit 20 covers the service robot 6, the data packages are transferred from the logistic unit 20 to the service robot 6. Then the service robot 6 moves along its path 9.6 to the corresponding field robot 1 to 5 for which the data packages are assigned. When the short-range communication reach R6 of the service robot 6 covers the corresponding robot 1 to 5, the data packages will be transferred from the service robot 6 to the corresponding robot 1 to 5. In this way, a data transfer from the logistic unit 20 to the corresponding field robot 1 to 5 through the short-range communication could be completed without the need for the corresponding robot 1 to 5 to move into the reach R20 of the short-range communication of the logistic unit 20.

If data should be transferred from one of the field robots 1 to 5 being out of reach of the short-range communication to the logistic unit 20, the data can be transferred via the service robot 6 analogously. Thus, a bidirectional data transfer between a field robot 1 to 5 and the logistic unit 20 can be realized with the aid of the service robot 6.

The disclosure will be explained now in more detail with the following description.

FIG. 2 shows a similar situation as already shown in FIG. 1. The service robot 6 can move around the agricultural field 7 along its corresponding path 9.6 surrounding the field 7 in the headland 30. Depending on the position of the robot 6, the reach R6 of the short-range communication device 11 of the robot 6 covers a different part of the outer edge of the agricultural field 7 from the headland 30 up to the coverage margin 31.

The logistic unit 20 is deployed beyond the field 7 at a location near to the path 9.6 of the service robot 6 so that the service robot 6 can get close enough to the logistic unit 20 to enable a bidirectional data exchange through the short-range communication channel between the service robot 6 and the logistic unit 20.

It is assumed now, that robot 4 shall be prepared for a field operation to be performed in its corresponding subfield 7.4. Robot 4 can be deployed within the logistic unit 20 (analogous to FIG. 5) or at any other location where robot 4 can receive a command through the long-range communication device 22 from the logistic unit 20.

Initialization

Figure 6:
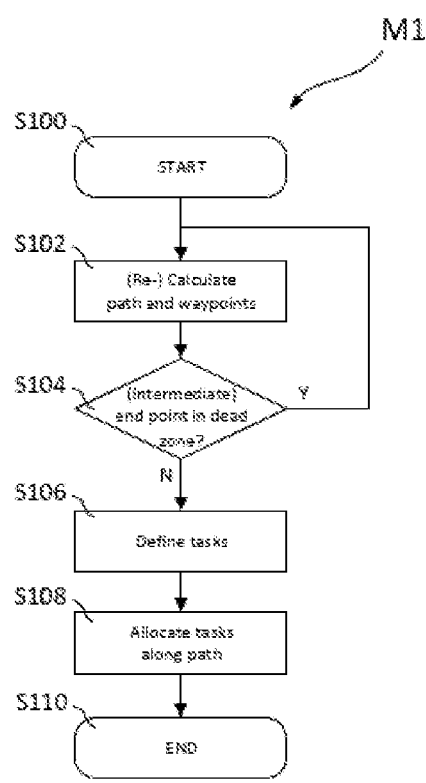
FIG. 6 shows a flow chart.

The central controller 29 of the logistic unit 20 executes a method M1 as depicted in FIG. 6. After starting the method M1 with act S100, the central controller 29 calculates at the following act S102 a path the field robot 4 shall traverse through its assigned subfield 7.4. The result will be the path 9.4 as depicted in FIGS. 1 to 3. The central controller 29 also determines several waypoints along the path 9.4 as depicted in FIGS. 2 to 3. A first waypoint 41 is the starting point from which the robot 4 shall start to follow its path 4.9. Another waypoint 45 is a first intermediate end point at which the robot 4 shall interrupt travelling along the path 4.9. Between the waypoint 41 and waypoint 45 additional waypoints as waypoint 42 to 44 can be defined by the central controller 29. Waypoint 44 can be defined as field entry point. Next to the first intermediate end point 45 the central controller 29 defines a second intermediate end point 47 and a third intermediate end point 48 as additional waypoints. A last waypoint 51 can be defined by the central controller 29 as a final end point where the path 4.9 effectively ends. This end point 51 may overlap with the starting point 41.

In addition, the central controller 29 can calculate a path 9.8 that runs parallel to a path segment 9.7 of path 9.6 to avoid a collision between two robots moving along the same path segment 9.7 so that one of the robots can evade to the parallel path 9.8 in the headland 30. Path 9.8 can also be a regular part of the path 9.4 of the field robot 4.

Continuing with act S104, the central controller 29 checks whether one of the (intermediate) end points 45, 47, 48 and 51 is located in a dead zone 35. This dead zone 35 defines a zone within which a short-range communication neither between the (stationary) logistic unit and a selected field robot 1 to 5 nor between the service robot 6 (which is bound to its path 9.6) and the selected field robot 1 to 5 is possible due to the limited reach of the short-range communication.

Although only one dead zone 35 is depicted in FIG. 2 it should be clear that the dead zone could be different for each field robot 1 to 5 in dependence of the individual short-range reach R1 to R5. Then, the dead zone 35 for this specific field robot would vary accordingly. But for simplification, it is assumed that the reaches R1 to R5 of all field robots 1 to 5 are identical and thus all field robots 1 to 5 have the same dead zone 35 as depicted in FIGS. 1 to 3.

As can be seen in FIG. 2, as long as the field robots 1, 3 to 5 travel beyond the coverage margin 31 and thereby outside the dead zone 35, their corresponding short-range communication reaches R1, R3 to R5 extend over a part of the path 9.6 of the service robot 6 so that the service robot 6 can be covered by the corresponding reach R1, R3 to R5 at a certain position. At that position, the reach R6 of the service robot 6 covers concurrently the corresponding field robot 1, 3 to 5 (e. g. see position of service robot 6 and field robot 4 in FIG. 2) so that a bidirectional data transfer through the short-range communication channel is enabled.

At some positions outside the dead zone 35, there is also a bidirectional data transfer through the short-range communication channel between the logistic unit 20 and a corresponding field robot 1 to 5 possible. But robot 2, which is travelling within the dead zone is not able to exchange data through the short-range communication channel with service robot 6 because its short-range communication reach R2 is too short to cover a part of the path 9.6. The short-range communication reach R2 of robot 2 is also too short to cover the logistic unit 20.

If an (intermediate) end point is located in the dead zone 35, as for example the second intermediate end point 47, the central controller 29 returns back to act S102 and determines a different (intermediate) end point located outside the dead zone 35, for example a recalculated second intermediate end point 46. If no further (intermediate) end point is located within the dead zone the method M1 proceeds with act S106.

When the central controller 29 (re-)calculates the (intermediate) end points, the central controller 29 considers the very limited size of the buffer 18 of the field robot 4. Because of the limited size of the buffer 18 the memory space needed for the full path 9.4 including the waypoints and the tasks to be allocated along the path 9.4 according to the method acts S106 and S108 would exceed the limited size of the buffer 18 and data would be lost. Thus, the central controller 29 splits the full path 9.4 into several path segments wherein a path segment extends from an intermediate end point to a subsequent intermediate end point, that is to say a first path segment extends from the starting point 41 to the first intermediate end point 45, a second path segment extends from the first intermediate end point 45 to the recalculated second intermediate end point 46, a third path segment extends from the recalculated second intermediate end point 46 to the third intermediate end point 48 and a fourth path segment extends from the third intermediate end point 48 to the final end point 51. For each path segment the central controller 29 defines a data set comprising the path segment, the corresponding waypoints and the tasks allocated to the path segment wherein the memory space needed for each data set is smaller than the size limit of the buffer 18.

At act S106, the central controller 29 defines the tasks the field robot 4 shall perform along its path 9.4. The tasks depend on the tool 15 the overall functionality of the field robot 4. For example a task can be a movement maneuver (e. g. steering, adjusting the speed, adjusting the tire pressure, etc.), or any other action as sensing the environment by the sensor device 16 (e. g. detecting the crops, weeds, etc.), analyzing the field 7 or the crops (e. g. detecting the humidity of the soil or the crop growth), treating the agricultural field 7 (e. g. weeding, seeding, spraying fertilizer or plant protection agents, changing the rate of spaying [milliliters of spraying liquid per second], etc.) or signaling (e. g. illuminating warning lights, blowing an acoustic warning signal, etc.).

At act S108 the central controller 29 allocates the tasks along the path 9.4 of the field robot 4. Thus, it will be defined what the field robot 4 has to do at a certain position or within a segment of his path 9.4. E. g. from the starting point 41 to the waypoint 44 the field robot 4 will travel through the headland 30 wherefore the tasks comprise movement maneuvers only. But at waypoint 44, the robot 4 will enter the agricultural field 7. From this waypoint 44 onwards, an allocated task can demand to activate the tool 15 for the treatment of the field 7. Several tasks can be executed concurrently by the field robot 4, e. g. treating the field 7, analyzing the crops as well as executing movement maneuvers.

The calculated path 9.4, respectively the four path segments defining the path 9.4, the waypoints 41 to 51 and all the allocated tasks are stored in the data storage 28 of the logistic unit 20.

Figure 8:
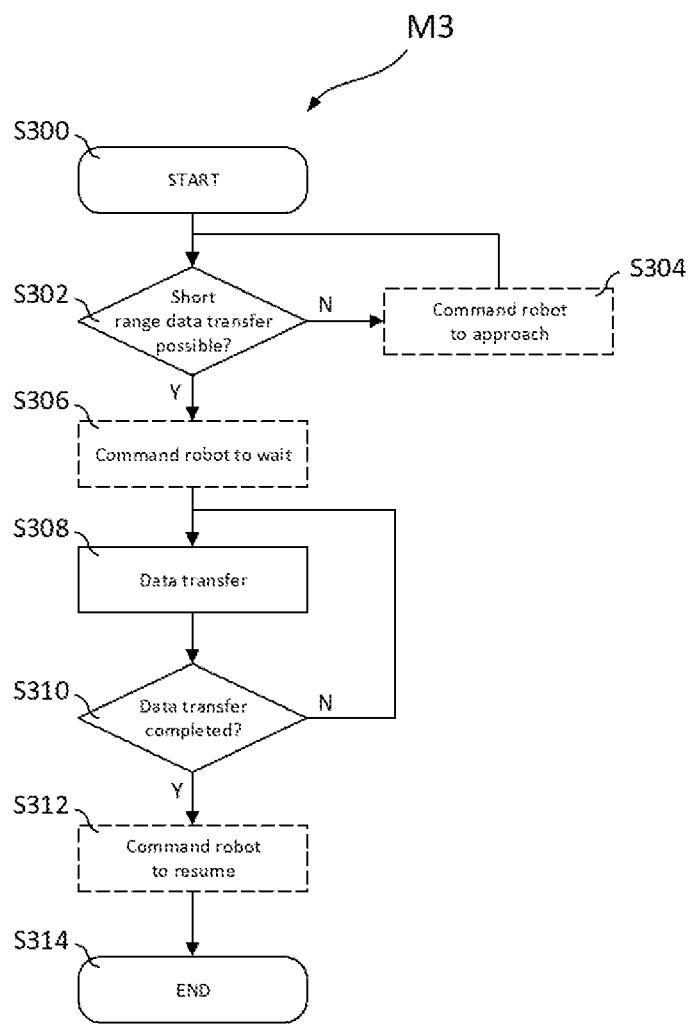
FIG. 8 shows a flow chart.

After the method M1 has finished at act S110 the central controller 29 of the logistic unit 20 executes method M3 starting with act S300 as depicted in FIG. 8. The method M3 proceeds with act S302 and the central controller 29 retrieves the position of the field robot 4 via the long-range communication channel and checks whether the position of the field robot 4 is appropriate for a data transfer through the short-range communication channel between the field robot 4 and the logistic unit 20.

If the field robot 4 and the logistic unit 20 are not covered mutually by their short-range communication reaches R4 and R20, a bidirectional data transfer between the logistic unit 20 and the field robot 4 through the short-range communication channel is not possible. Thus at act S304, the central controller 29 commands the robot 4 to approach close enough to the logistic unit 20. The central controller 29 sends the coordinate of the starting point 41 and a command to move to this coordinate to the field robot 4 by the long-range communication device 22 of the logistic unit 20. The field robot 4 receives the coordinate and the command to move by its long-range communication device 12 and follows the command.

When the field robot 4 and the logistic unit 20 are covered mutually by their short-range communication reaches R4 and R20, the central controller 29 of the logistic unit 20 can optionally command the robot 4 to wait (act S306), e. g. at waypoint 41, by sending a corresponding command via the long-range communication channel before proceeding to act S308.

Alternatively, the method M3 proceeds directly to act S308 when a short-range communication between the field robot 4 and the logistic unit 20 is possible to execute the data transfer. The data transfer of act S308 comprises several routines. The stored data in the buffer 18 is transferred to the data storage 28 of the logistic unit 20 to avoid a data loss of the data stored in the buffer 18 of the field robot 4 caused by an unintended overwriting. Next, the logistic unit 20 can back up the received data of the buffer 18 and send it to a data cloud via the cellular communication device 23 or share this data with an external farm management information system (FMIS). After the successful backup, the buffer 18 of the field robot 4 is deleted to free up the full memory space.

Then, the central controller 29 of the logistic unit 20 copies a first data set comprising the first path segment from the starting point 41 to the first end point 45, the waypoints and all the allocated tasks to this path segment from the data storage 28 of the logistic unit 20 to the buffer 18 of the field robot 4 through the short-range communication channel. As described above, the size of the data of the first path segment including the waypoints and the allocated tasks is small enough to be stored completely on the buffer 18.

At act S310 the central controller 29 checks whether the data transfer is completed. As long as the data transfer is incomplete, the data transfer of act S308 will be continued. Simultaneously the field robot 4 can execute other tasks, e. g. moving along its path 9.4, so far as the field robot 4 and the logistic unit 20 remain covered mutually by their short-range communication reaches R4 and R20.

After the data transfer was completed, the central controller 29 can optionally command the field robot 4 to resume its field operation (act S312). Otherwise, the method M3 ends immediately at act S314.

Field Operation: First Path Segment

Following transfer, the field robot 4 is now ready for a field operation. The field operation will be explained now in more detail using the example of field robot 4.

Figure 7:
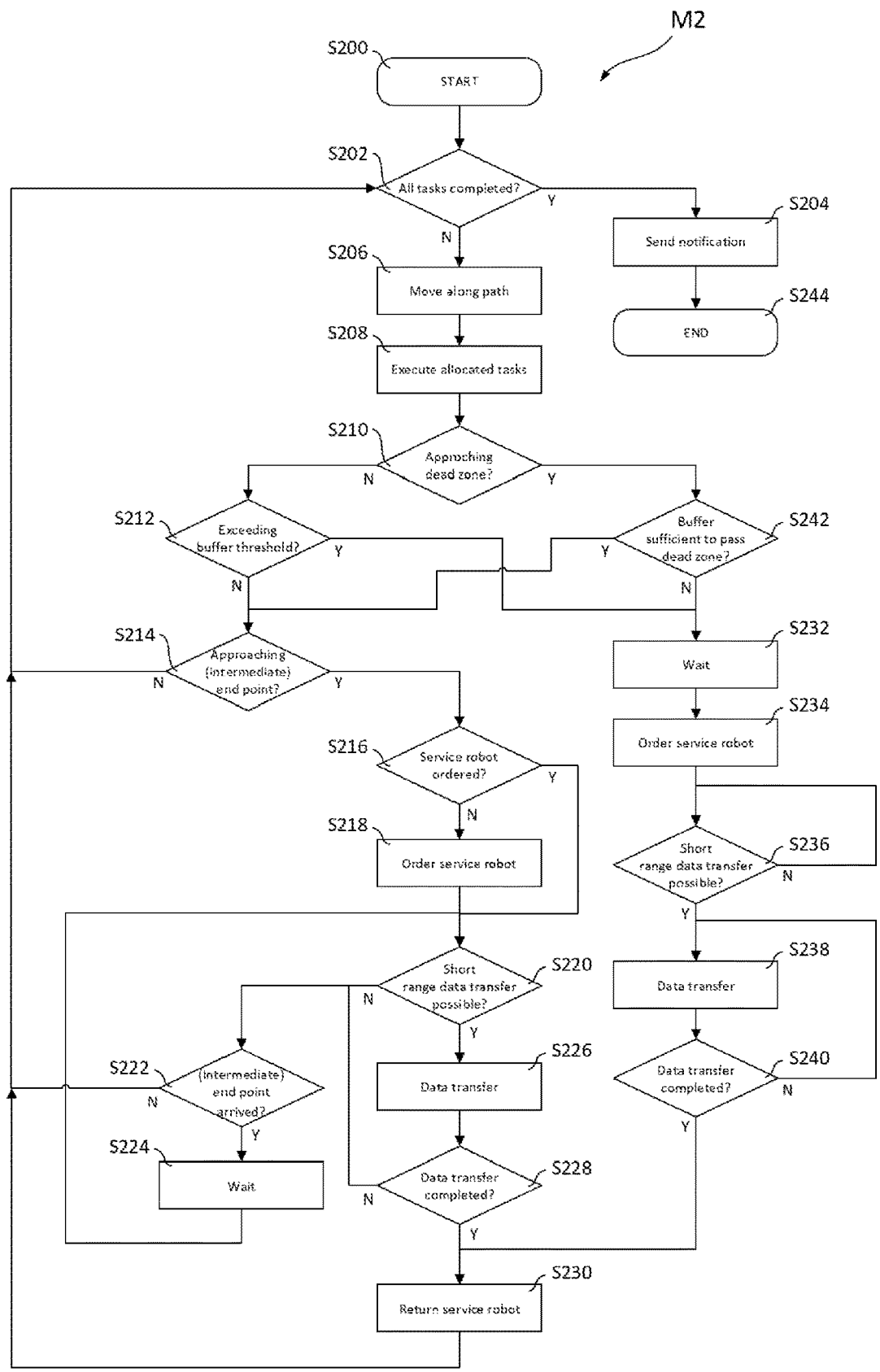
FIG. 7 shows a flow chart.

A method M2 as depicted in FIG. 7 will be executed. The method M2 starts with act S200 and proceeds with act S202. At act S202 the controller 19 of the field robot 4 or the central controller 29 of the logistic unit checks whether the field robot 4 completed all allocated tasks along its path 9.4.

If so, the method M2 proceeds to act S204. Otherwise, as it is assumed to be the case here, the method M2 proceeds to act S206 and the field robot 4 moves along its path 9.4. Simultaneously the controller 19 of the field robot 4 executes act S208 and executes all tasks allocated along the path 9.4. It is assumed that the field robot 4 is located at the starting point 41. The controller 19 reads out the first data set containing the first path segment, the waypoints and the tasks allocated to the first path segment which are stored in the buffer 18 to control the field robot 4 accordingly.

The controller 19 determines the position of the field robot 4 based on the global positioning system 13 and compares the position information with the segment of the path 9.4 to guide the field robot 4 along the path 9.4 and to check whether a specific task needs to be executed at the determined position of the field robot 4.

Consequently, the field robot 4 travels along path 9.4 from the starting point 41 in the east direction (the north direction is indicated by a reference 40) and turns to the north direction to pass waypoint 42 (see FIG. 2). Then, the field robot 4 turns again and travels in west direction to the waypoint 43. At waypoint 43 the field robot 4 turns again and travels in north direction up to waypoint 44, the field entry point.

While the field robot 4 continues to travel along the path 9.4 to the next waypoint 45, here the first intermediate end point, the controller 19 recognizes based on the allocation of the tasks to the path 9.4 and the current global position that a task shall be executed at that position to treat the agricultural field 7. This task causes the controller 19 to activate a corresponding actuator immediately after passing the field entry point 44. For example, the field robot 4 activates the tool 15, which can be a seeder, to seed (by placing or planting) a seed along the path 9.4 after every 13 centimeters.

Another task can cause the controller 19 to record the field operation and to store the recordings to the buffer 18. For example, the controller 19 can log the exact position of each seeded seed using the position information of the global positioning system 13 and save the corresponding positions to the buffer 18. Another task can cause the sensor device 16, e. g. a camera, to take a photo of each position where a seed was placed and to store the recorded data to the buffer 18.

It is clear that the tasks mentioned are only examples and that arbitrary tasks could be allocated to the path 9.4 to be executed by the controller 19.

The method M2 proceeds with act S210. The central controller 29 of the logistic unit 20 retrieves the current global position of the field robot 4 via the long-range communication channel and checks whether the field robot 4 approaches the dead zone 35. Alternatively, the controller 19 of the field robot 4 can execute the check. An approach is detected if the current position comes below a predefined distance threshold to the dead zone 35 or if the estimated travel time to approach the dead zone 35 is lower than a predetermined time threshold. If a threshold is exceeded the method M2 proceeds to act S242, if not the method M2 proceeds to act S212.

It is assumed now that no threshold is exceeded and the method M2 moves to act S212. The central controller 29 of the logistic unit 20 retrieves the size of the free space of the buffer 18 of the field robot 4 via the long-range communication channel and checks whether the size of the data stored in the buffer 18 exceeded a predefined buffer threshold, e. g. 90% of maximum buffer size. Alternatively, the controller 19 of the field robot 4 can execute the check. If the buffer threshold is exceeded the method M2 proceeds to act S232, if not the method M2 proceeds to act S214.

It is assumed now that no threshold is exceeded and the method M2 moves to act S214. The central controller 29 of the logistic unit 20 retrieves the current global position of the field robot 4 via the long-range communication channel and checks whether the field robot 4 approaches one of the (intermediate) end points 45, 46, 48 and 51. Alternatively, the controller 19 of the field robot 4 can execute the check. An approach is detected if the current position comes below a predefined distance threshold to the (intermediate) end point 45, 46, 48 or 51 or if the estimated travel time to approach one of the (intermediate) end points 45, 46, 48 or 51 is lower than a predetermined time threshold. If a threshold is exceeded, the method M2 proceeds to act S216; if not, the method M2 returns to act S202 and continues as described above.

It is assumed now that the field robot 4 travelled far enough along the path 9.4 and an approach to the first intermediate end point 45 is detected at act S214. As described above, the buffer 18 of the field robot 4 does not comprise the full path 9.4 but the first path segment extending from the starting point 41 to the first intermediate end point 45 only. Accordingly, the field robot 4 will interrupt travelling and treating the agricultural field 7 when the field robot 4 arrives the first intermediate end point 45. Thus, the second path segment extending from the first intermediate end point 45 to the recalculated second intermediate end point 46 including the allocated tasks needs to be transferred to the field robot 4.

Because the short-range communication device 11 of the field robot 4 is out of reach of the short-range communication device 21 of the logistic unit 20 (as can be seen in FIG. 2) a data transfer via the short-range communication channel is not possible, even if the field robot 4 travels further to the first intermediate end point 45. Thus, according to the disclosure, the second path segment including the allocated tasks will be transferred from the logistic unit 20 to the service robot 6 whereas the service robot 6 will be used as a mobile data exchange unit to get connected with the field robot 4 via the short-range communication channel to transfer the second path segment to the field robot 4.

The method M2 proceds with act S216 and the central controller 29 of the logistic unit 20 checks whether the service robot 6 has already been ordered. If so, the method M2 proceeds to act S220; if not, the method M2 proceeds to act S218.

It is assumed now that the service robot 6 wasn't ordered before and that the second path segment needs to be transferred from the logistic unit 20 to the service robot 6 first. The method M2 proceeds with act S218.

Field Operation: Second Path Segment

At act S218 the logistic unit 20 plans the activities to be done by the service robot 6 and executes method M1 and method M3 for the service robot 6 once again. I. e. the following acts S100 to S110 of method M1 and the acts S300 to S314 of method M3 as explained in context of the field robot 4 before are applied analogously to the service robot 6.

Method M1 is started for the service robot 6. At act S102 the central controller 29 calculates the path 9.6 around the agricultural field 7 in the headland 30, the waypoint 41 as starting point, a waypoint 42, a waypoint 53 for the planned data transfer with the field robot 4 and the waypoint 51 as final end point. As can be seen in FIG. 2 the waypoint 53 was determined in such a manner that a data transfer through the short-range communication channel between the service robot 6 and the field robot 4 approaching the first intermediate end point 45 is possible.

At act S106 the central controller 29 defines the data transfer as task for the service robot 6 and allocates this task to the path 9.6 respectively to the waypoint 53 at act S108. The task comprises a second data set. The second data set comprising the second path segment of the field robot 4 from the first intermediate end point 45 to the recalculated second end point 46, the waypoints and all the allocated tasks to this path segment have been calculated and stored to the data storage 28 of the logistic unit 20 by executing method M1 the first time for the field robot 4. The central controller 29 copies the second data set to the buffer 18 of the service robot 6.

After method M1 finished at act S110, the central controller 29 of the logistic unit 20 starts the method M3 for the service robot 6 with act S300 and executes the following acts consecutively. When the service robot 6 is covered by the short-range communication reach R20 of the logistic unit 20, the path 9.6, the waypoints 41, 42, 51, and 53 and the allocated tasks for the service robot 6 will be transferred and stored to the buffer 18 of the service robot 6 (act S308).

After the data transfer between the service robot 6 and the logistic unit 20 was completed, the service robot 6 is ready for the data transfer with the field robot 4. The central controller 29 of the logistic unit 20 commands the service robot 6 via the long-range communication channel to move to the waypoint 53 (act S312) and ends the execution of the method M3 (act S314).

The service robot 6 was ordered now to approach the field robot 4 (act S218). Consequently, the controller 19 of the service robot 6 determines its position based on the global positioning system 13 of the service robot 6 and compares the position information with the path 9.6 to guide the service robot 6 along the path 9.6. The service robot 6 travels along path 9.6 from the starting point 41 in the east direction (the north direction is indicated by a reference 40) and turns to the north direction to pass waypoint 42 (see FIG. 2). Then, the service robot 6 turns again and travels to the waypoint 53.

After act S218 was completed, method M2 proceeds with act S220. The central controller 29 retrieves the positions of the field robot 4 and the service robot 6 and checks whether a data transfer through the short-range communication channel between the field robot 4 and the service robot 6 is possible. Alternatively, the controllers 19 of the field robot 4 or the service robot 6 can execute the check.

If the robots 4 and 6 are not covered mutually by their short-range communication reaches R4 and R6, a data transfer between the service robot 6 and the field robot 4 through the short-range communication channel is not possible. Then the method M2 proceeds to act S222. The controller 19 of the field robot 4 or the central controller 29 of the logistic unit 20 checks whether the field robot 4 has arrived its first intermediate end point 45.

If not, the field robot 4 is allowed to travel along its path 9.4 until the field robot 4 reaches at the latest its first intermediate end point 45. The method M2 returns to act S202 again.

If the field robot 4 has arrived its first intermediate end point 45, its controller 19 or the central controller 29 of the logistic unit 20 executes act S224 and command the field robot 4 to wait at the waypoint 45 while the service robot 6 is still approaching to the field robot 4 along the path 9.6 (till waypoint 53).

After act S224 the method M2 returns to act S220. Now it will be assumed that the robots 4 and 6 are covered mutually by their short-range communication reaches R4 and R6. So, a bidirectional data transfer through the short-range communication channel between the field robot 4 and the service robot 6 is possible and recognized at act S220.

Then, the method M2 proceeds to act S226 and the data transfer is executed. The data transfer of act S226 comprises several routines. First, the stored data in the buffer 18 of the field robot 4 is transferred to the buffer 18 of the service robot 6 to avoid a data loss of the data stored in the buffer 18 of the field robot 4 caused by an unintended overwriting. This data comprises the recordings of the field operation recorded during the execution of the allocated tasks (see act S208). After a successful backup the buffer 18 of the field robot 4 is deleted to free up the full memory space.

Then, the second data set comprising the second path segment from the first intermediate end point 45 to the recalculated second intermediate end point 46, the waypoints and all the allocated tasks to this path segment is copied from the buffer 18 of the service robot 6 to the buffer 18 of the field robot 4 through the short-range communication channel. As described above, the size of the data of the second path segment including the waypoints and the allocated tasks is small enough to be stored completely in the buffer 18 of the field robot 4.

Proceeding to act S228, it is checked whether the data transfer is completed. As long as the data transfer is incomplete the method M2 proceeds with act S222. Simultaneously the field robot 4 can execute other tasks, e. g. moving along its path 9.4 till the first intermediate end point 45 is arrived, or the service robot 6 can move along its path 9.6 till the waypoint 53 is arrived, while both robots 4 and 6 stay connected via the short-range connection channel.

After the data transfer was completed, the method M2 proceeds with act S230 and the logistic unit 20 commands the service robot 6 to return to the logistic unit 20. Thereupon, the central controller 29 of the service unit 20 executes method M3 in respect of the service robot 6 (act S300). At act S302, the central controller 29 retrieves the position of the service robot 6 via the long-range communication channel and checks whether a data transfer trough the short-range communication channel between the service robot 6 and the logistic unit 20 is possible.

This is not the case for the service robot 6 located at the waypoint 53. Thus at act S304, the central controller 29 commands the service robot 6 to approach close enough to the logistic unit 20. The central controller 29 sends the coordinate of the starting point 41 and a command to move to this coordinate to the service robot 6 by the long-range communication device 22 of the logistic unit 20. The service robot 6 receives the coordinate and the command to move by its long-range communication device 12 and follows the command.

When a data transfer through the short-range communication channel between the service robot 6 and the logistic unit 20 is possible, the logistic unit 20 can optionally command the service robot 6 to wait (act S306), e. g. at waypoint 41, by sending a corresponding command via the long-range communication channel before proceeding to act S308.

Alternatively, the method M3 proceeds directly to act S308 when a short-range communication between the service robot 6 and the logistic unit 20 is possible to execute the data transfer. Then, the stored data in the buffer 18 of the service robot 6 which comprises the recordings of the field operation of the field robot 4 (see act S226: data transfer of the recordings) is transferred to the data storage 28 of the logistic unit 20. Next, the logistic unit 20 can back up the received data of the buffer 18 and send it to a data cloud via the cellular communication device 23 or share this data with an external farm management information system (FMIS).

Proceeding to act S310 the central controller 29 checks whether the data transfer is completed. As long as the data transfer is incomplete the data transfer of act S308 will be continued. Simultaneously the service robot 6 can execute other tasks, e. g. moving along its path 9.6, so far as the short-range communication reach R6 of the service robot 6 covers the logistic unit 20.

After the data transfer was completed, the central controller 29 can optionally command the service robot 6 to resume an open task (act S312). Otherwise, the method M3 in respect of the service robot 6 ends immediately at act S314 and act S230 is completed.

Then, the method M2 returns to act S202.

Back at act S202, the controller 19 of the field robot 4 or the central controller 29 of the logistic unit checks whether the field robot 4 completed all allocated tasks along its path 9.4. Because the field robot 4 got new tasks at act S226 (data transfer) as explained before, the method M2 proceeds with act S206 and the subsequent acts again.

Hence the field robot 4 continues to travel along the second path segment of the path 9.4 and to treat the agricultural subfield 7.4 according to the allocated tasks from the first intermediate end point 45 to the recalculated second intermediate end point 46. Analogously as described above in the context of the first data set, now the controller 19 reads out the second data set containing the second path segment, the waypoints and the tasks allocated to the second path segment which are stored in the buffer 18 of the field robot 4 to control the field robot 4 accordingly.

Buffer Overflow

It is assumed now, that the buffer threshold was exceeded at act S212 while the field robot 4 was operating in its subfield 7.4. Before the buffer 18 of the field robot 4 overflows and data is lost, the method M2 proceeds with act S232. The controller 19 stops the operation of the field robot 4 by executing a wait command received from the logistic unit 20 via the long-range communication channel or determined by the controller 19 itself.

The method M2 proceeds with act S234 and the service robot 6 is ordered analogously to act S218 that was explained before. Then, the service robot 6 approaches the field robot 4 waiting in the subfield 7.4.

The method M2 proceeds with act S236 and it is checked whether a data transfer through the short-range communication channel between the field robot 4 and the service robot 6 is possible analogously to act S220 that was explained before. If a data transfer is not possible the method M2 returns to act S236.

If a data transfer through the short-range communication channel is possible the method M2 proceeds to act S238 and a backup of the data stored in the buffer 18 of the field robot 4 is executed analogously to act S226 that was explained before.

At act S240 it is checked whether the data transfer is completed. As long as the data transfer is incomplete, the method M2 returns to act S238. Simultaneously the service robot 6 can move along its path 9.6 while both robots 4 and 6 stay connected via the short-range communication channel.

After the data transfer was completed, the method M2 proceeds to act S230 and the logistic unit 20 commands the service robot 6 to return to the logistic unit 20 as described before.

After act S230 was completed, the method M2 returns to act S202 and the field robot 4 resumes its field operation and records field operation data and stores the data to its buffer 18.

Field Operation: Third Path Segment

As depicted in FIG. 3, it is assumed now that the field robot 4 approaches the recalculated second intermediate end point 46. While method M2 is still executed this event is detected at act S214 and the method M2 repeats the subsequent acts S216 to S230. Thereby a third data set comprising the third path segment extending from the recalculated second intermediate end point 46 to the third intermediate end point 48, the waypoints and the tasks allocated to the third path segment will be transferred to the field robot 4 with the support of the service robot 6. In contrast to FIG. 2, the service robot 6 needs to travel to a waypoint 54 instead of waypoint 53 so that the field robot 4 and the service robot 6 are covered mutually by their short-range communication reaches R4 and R6.

After the data transfer (act S228) and the return of the service robot 6 (act S230) were completed, the method M2 returns to the act S202 again and the field robot 4 continues its field operation along the third path segment of path 9.4 executing act S206 and the subsequent acts.

Dead Zone Approach

It is assumed now that the field robot 4 approaches a waypoint 52 that is located in front of the dead zone 35 (see FIG. 3). As soon as the predefined threshold is exceeded, an approach to the dead zone 35 will be detected at act S210. Then, the method M2 proceeds with act S242 and it is checked whether the buffer 18 of the field robot 4 has sufficient free space to pass the dead zone 35 along the path 9.4. Hence it is ensured that no data of the buffer 18 is lost or corrupted when the field robot 4 stores the recordings of the field operation executed within the dead zone 35 to the buffer 18. The central controller 29 of the logistic unit 20 retrieves the size information of the free space of the buffer 18 of the field robot 4 via the long-range communication channel and checks whether the free space is enough. Alternatively, the controller 19 of the field robot 4 can execute the check. If the free size of the buffer 18 is enough the method M2 proceeds to act S214; if not, the method M2 proceeds to act S232.

Field Operation: Forth Path Segment

It is assumed now that the field robot 4 approaches the third intermediate end point 48. While method M2 is still executed, this event is detected at act S214 and the method M2 repeats the subsequent acts S216 to S230. Thereby a fourth data set comprising the fourth path segment extending from the third intermediate end point 48 to the final end point 51, the waypoints 49 and 50, and the tasks allocated to the fourth path segment will be transferred to the field robot 4 with the support of the service robot 6.

After the data transfer (act S228) and the return of the service robot 6 (act S230) was completed, the method M2 returns to the act S202 again and the field robot 4 continues its field operation along the forth path segment of path 9.4 executing act S206 and the subsequent acts analogously as described before.

When the field robot 4 arrives the waypoint 49, the subfield 7.4 was treated completely by the field robot 4 and the field robot 4 enters the headland 30. At this waypoint 49, an allocated task can demand the controller 19 to deactivate the tool 15, the sensor device 16 or both.

The field robot 4 moves further and crosses the path 9.6 or 9.7. When the field robot 4 arrives at the waypoint 50, an allocated task can demand the field robot 4 to execute a turn maneuver so that the field robot 4 travels along the path 9.8 in east direction.

Method M2 checks that no further tasks need to be executed by the field robot 4 at act S202 and proceeds with act S204. Then, the controller 19 of the field robot 4 sends a notification to the logistic unit 20 via the long-range communication channel to indicate that all tasks have been completed by the field robot 4. Method M2 proceeds to act S244 and ends.

The logistic unit 20 receives the notification from the field robot 4 and as consequence the central controller 29 of the logistic unit 20 starts the method M3 to bring the field robot 4 back to the logistic unit 20 and to back up the recordings stored in the buffer 18 of the field robot 4. The method M3 is executed analogous to the manner described before. At act S304 the field robot 4 is commanded to approach to the final end point 51. When a data transfer through the short-range communication channel between the field robot 4 and the logistic unit 20 is possible (act S302), the data transfer will be executed (act S308). The recordings of the field robot 4 are saved to the data storage 28 of the logistic unit 20.

Finally, method M3 ends with act S313.

Swarm Functionality

The disclosure was explained in the context of field robot 4. Instead of field robot 4 the whole disclosure comprising its methods M1, M2 and M3 can be executed with any other field robot 1 to 3 or 5. The disclosure can be applied to all robots 1 to 6 simultaneously to execute a swam application wherein the central controller 29 of the logistic unit 20 has the overall control.

Method M2 Extended

Figure 9:
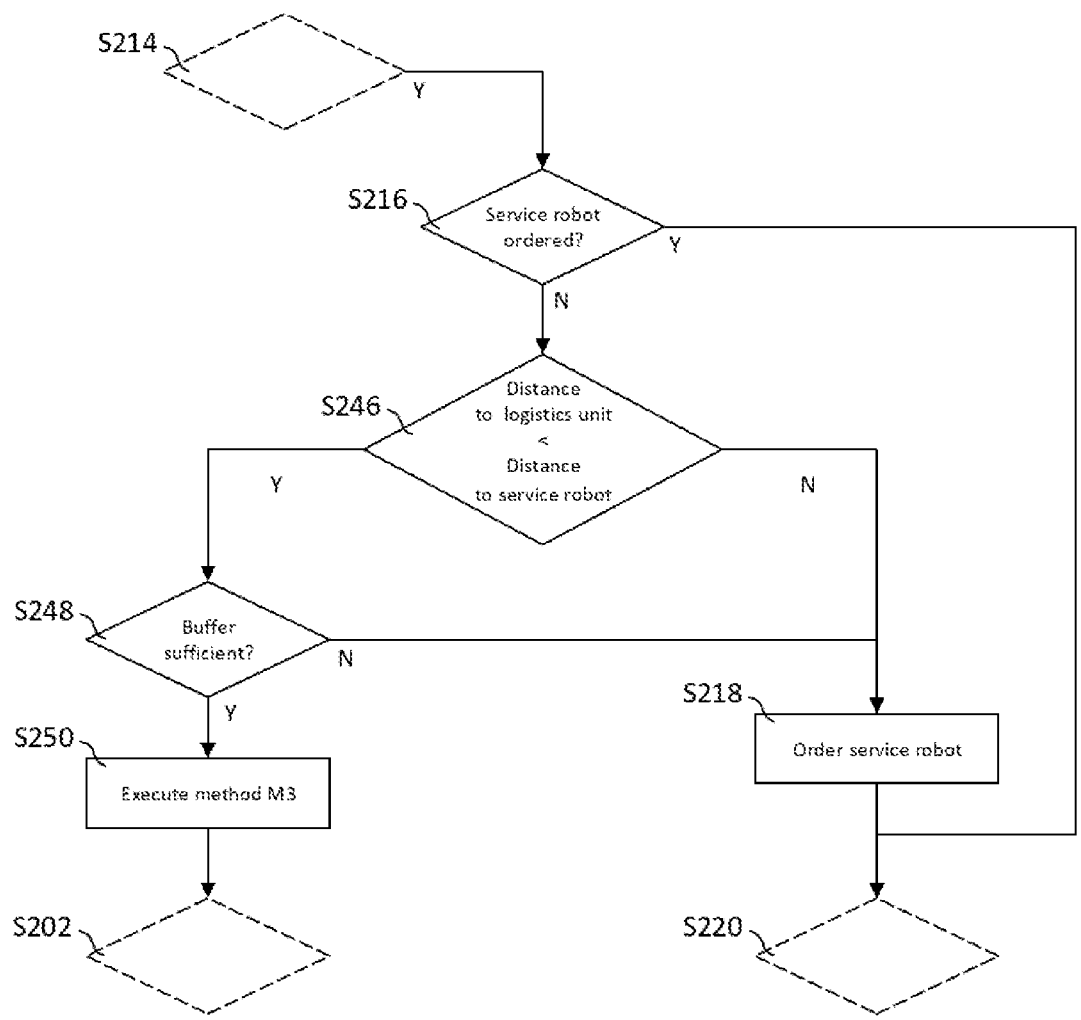
FIG. 9 shows a flow chart.

In a preferred embodiment of the disclosure the method M2 comprises the additional acts S246 to S250 as depicted in FIG. 9. The disclosure will be explained in the context of field robot 5 now (instead of field robot 4). It is assumed that method M2 is already running and act S216 is executed. If the service robot 6 has been ordered already the method M2 proceeds with act S220 and the subsequent acts analogously for the field robot 5 as described before.

If the service robot 6 has not been ordered, then the method M2 proceeds with act S246. The logistic unit 20 retrieves the position of the field robot 5 and the position of the service robot 6. Both positions are sent through the long-range communication channel from the robots 5 and 6 to the logistic unit 20. The logistic unit 20 calculates then a first distance the field robot 5 would need to travel towards the logistic unit 20 along its path 9.5 until a data transfer through the short-range communication channel between field robot 5 the logistic unit 20 is possible (distance to logistic unit). Then, the logistic unit 20 calculates a second distance the service robot 6 would need to travel along its path 9.6 towards the field robot 5 until a data transfer trough the short-range communication channel between the service robot 6 and the field robot 5 is possible (distance to service robot).

The central controller 29 compares the first and second distances and checks whether the distance to the logistic unit 20 is shorter than the distance to the service robot 6. If the distance to the logistic unit 20 is longer than the distance to the service robot 6, as it is the case in FIG. 2, than the method M2 proceeds with act S218 and the service robot 6 is ordered as described before.

If the distance to the logistic unit 20 is shorter than the distance to the service robot 6, as it is the case in FIG. 3, than the method M2 proceeds with act S248. At act S248 the central controller 29 of the logistic unit 20 retrieves the free space of the buffer 18 of the field robot 5 and determines whether the free buffer space is sufficient that the field robot 5 can travel the distance to the logistic unit 20 without a buffer overflow. If the field robot 5 cannot travel the distance to the logistic unit 20 without a buffer overflow, then the method M2 proceeds with act S218 and the service robot 6 is ordered as described before.

If the free space of the buffer 18 is sufficient that the field robot 5 can travel the distance to the logistic unit 20 without a buffer overflow the method M2 proceeds with act S250 and the method M3 is executed analogously as described before (act S300).

The method M3 proceeds with act S302 and the central controller 29 of the logistic unit 20 checks whether a data transfer through the short-range communication channel between the field robot 5 and the logistic unit 20 is possible.

If a data transfer is not possible the central controller 29 commands the robot 5 to approach close enough to the logistic unit 20 (act S304). When a data transfer is possible as can be seen in FIG. 3, the central controller 29 of the logistic unit 20 can optionally command the field robot 5 to wait (act S306) by sending a corresponding command via the long-range communication channel before proceeding to act S308.

Alternatively, the method M3 proceeds directly to act S308 when the field robot and the logistic unit 20 are covered mutually by their short-range communication reaches R5 and R20 to execute the data transfer. The data transfer of act S308 comprises several routines. The stored data in the buffer 18 is transferred to the data storage 28 of the logistic unit 20 to avoid a data loss of the data stored in the buffer 18 of the field robot 5 caused by an unintended overwriting. Next, the logistic unit 20 can back up the received data of the buffer 18 and send it to a data cloud via the cellular communication device 23 or share this data with an external farm management information system (FMIS). After the successful backup, the buffer 18 of the field robot 5 is deleted to free up the full memory space.

Then, the central controller 29 of the logistic unit 20 copies the subsequent data set comprising the corresponding path segment, the waypoints and all the allocated tasks to this path segment from the data storage 28 of the logistic unit 20 to the buffer 18 of the field robot 5 through the short-range communication channel.

At act S310 the central controller 29 checks whether the data transfer is completed. As long as the data transfer is incomplete the data transfer of act S308 will be continued. Simultaneously the field robot 5 can execute other tasks, e.g. moving along its path 9.5, so far as the short-range communication between the robot 5 and the logistic unit 20 will not be interrupted or disturbed.

After the data transfer was completed, the central controller 29 can optionally command the field robot 5 to resume its field operation (act S312). Otherwise, the method M3 ends immediately at act S314.

After the method M3 was completed the method M2 returns to act S202 and continues analogously as described before All references cited herein are incorporated herein in their entireties. If there is a conflict between definitions herein and in an incorporated reference, the definition herein shall control.

The invention claimed is:

1. A method for exchanging data within a robotic system comprising a mobile field robot for operating in a field and a mobile service robot, the field robot and the service robot each comprising a buffer for storing data and a first communication device with a short-range communication reach for exchanging data with each other, the method comprising:
commanding the field robot to operate in the field using data stored in the buffer of the field robot;
recognizing a necessity of a data transfer for the field robot;
commanding the service robot to approach to the field robot;
detecting that one of the robots is covered by the short-range communication reach of the other robot;
initiating a data transfer between the field robot and the service robot;
determining a dead zone being characterized in that the field robot and the service robot each are not coverable by the short-range communication reach of the other robot when the field robot is located in the dead zone; and
recognizing a necessity of a data transfer if the free buffer space of the buffer of the field robot is insufficient for a field operation of the field robot in the dead zone, wherein the field robot is configured to operate in a subfield of the field and the service robot is configured to operate exclusively out of the subfield.

2. The method of claim 1, wherein the robotic system comprising a logistic unit, the logistic unit comprising a data storage and a first communication device with a short-range communication reach for exchanging data with the field robot or the service robot, and the method comprising:
creating a data set containing:
a path for the field robot to be guided along; and
at least a task allocated to the path defining the field operation of the field robot; and
storing the data set to the data storage of the logistic unit.

3. The method of claim 1, wherein the path for the field robot extends through the subfield from a first waypoint to a second waypoint, whereas the second waypoint is located out of the dead zone.

4. The method of claim 2, wherein the logistic unit, the service robot and the field robot each comprising a second communication device with a long-range communication reach being greater than the short-range communication reach, wherein especially the long-range communication reach covers the field completely, and wherein the field robot and the service robot are commanded by commands sent by the logistic unit via the second communication device.

5. The method of claim 4, wherein the bandwidth of the first communication device is higher than the bandwidth of the second communication device and adapted to transfer the data set.

6. The method of claim 4, wherein the method comprises:
receiving data sent from the field robot to the logistic unit via the second communication device with the long-range communication reach, the data containing information of the recognition of a necessity of a data transfer, especially a detection of insufficient free buffer space of the field robot.

7. The method of claim 2, wherein the method comprises:
commanding the service robot to approach to the field robot if a travel time or a travel distance from the service robot to the field robot is shorter than a travel time or travel distance from the field robot to the logistic unit.

8. The method of claim 2, wherein the method comprises:
commanding the service robot to approach to the logistic unit;
detecting that the service robot is covered by the short-range communication reach of the logistic unit;
initiating a transfer of the first data set from the data storage of the logistic unit to the buffer of the service robot; and
initiating a transfer of the data set from the buffer of the service robot to the buffer of the field robot.

9. The method of claim 2, wherein the method comprises:
commanding the service robot to approach to the logistic unit; and
commanding a transfer of the operational data of the field robot from the buffer of the service robot to the data storage of the logistic unit.

10. The method of claim 1, wherein the robotic system comprises an additional mobile field robot configured to operate in a subfield different to the subfield of the other field robot, wherein the subfield of the additional field robot is free of a dead zone.

11. A method for exchanging data within a robotic system comprising a mobile field robot for operating in a field and a mobile service robot, the field robot and the service robot each comprising a buffer for storing data and a first communication device with a short-range communication reach for exchanging data with each other, the method comprising:
commanding the field robot to operate in the field using data stored in the buffer of the field robot;
recognizing a necessity of a data transfer for the field robot;
commanding the service robot to approach the field robot;
detecting that one of the robots is covered by the short-range communication reach of the other robot;
initiating a data transfer between the field robot and the service robot;
recognizing a necessity of a data transfer if a threshold of data stored to the buffer of the field robot is exceeded;
initiating a transfer of operational data of the field robot from the buffer of the field robot to the buffer of the service robot; and
initiating a free up of the buffer space of the buffer of the field robot.

12. A method for exchanging data within a robotic system comprising a mobile field robot for operating in a field and a mobile service robot, the field robot, and the service robot each comprising a buffer for storing data and a first communication device with a short-range communication reach for exchanging data with each other, the method comprising:
commanding the field robot to operate in the field using data stored in the buffer of the field robot;
recognizing a necessity of a data transfer for the field robot;
commanding the service robot to approach the field robot;
detecting that one of the robots is covered by the short-range communication reach of the other robot;
initiating a data transfer between the field robot and the service robot;
recognizing a necessity of a data transfer if additional data to the one stored in the buffer of the field robot is required, especially if a data set containing a path to guide the field robot and tasks allocated to the path to define the field operation of the field robot, are missing; and
initiating a data transfer from the buffer of the service robot to the buffer of the field robot.

* * * * *